March 27, 1945. C. J. RHOADS 2,372,293
HYDRAULIC ACTUATING CYLINDER CONTROL VALVE
Filed July 7, 1943 3 Sheets-Sheet 1
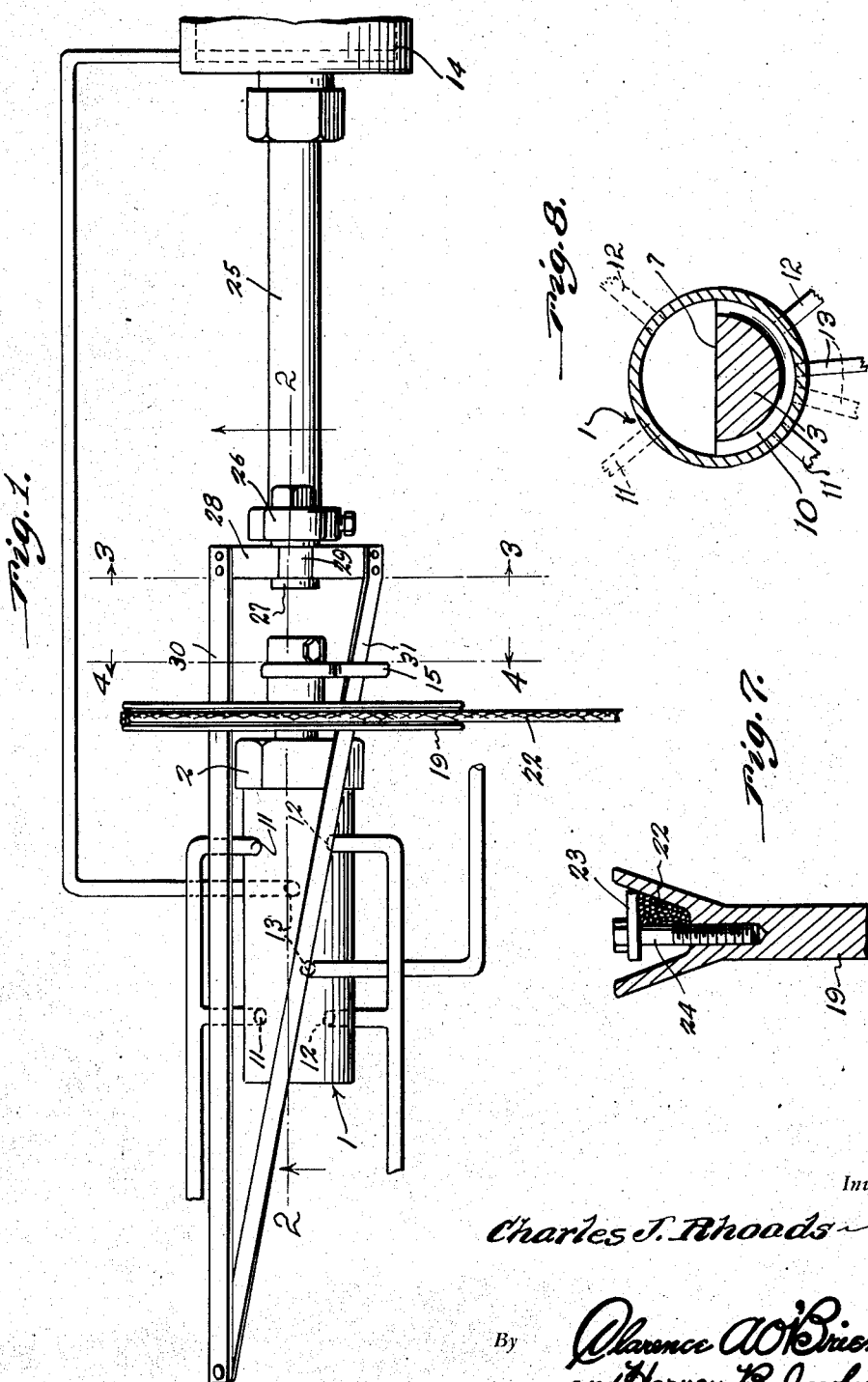
Inventor
Charles J. Rhoads
By Clarence A. O'Brien
and Harvey B. Jacobson
Attorneys

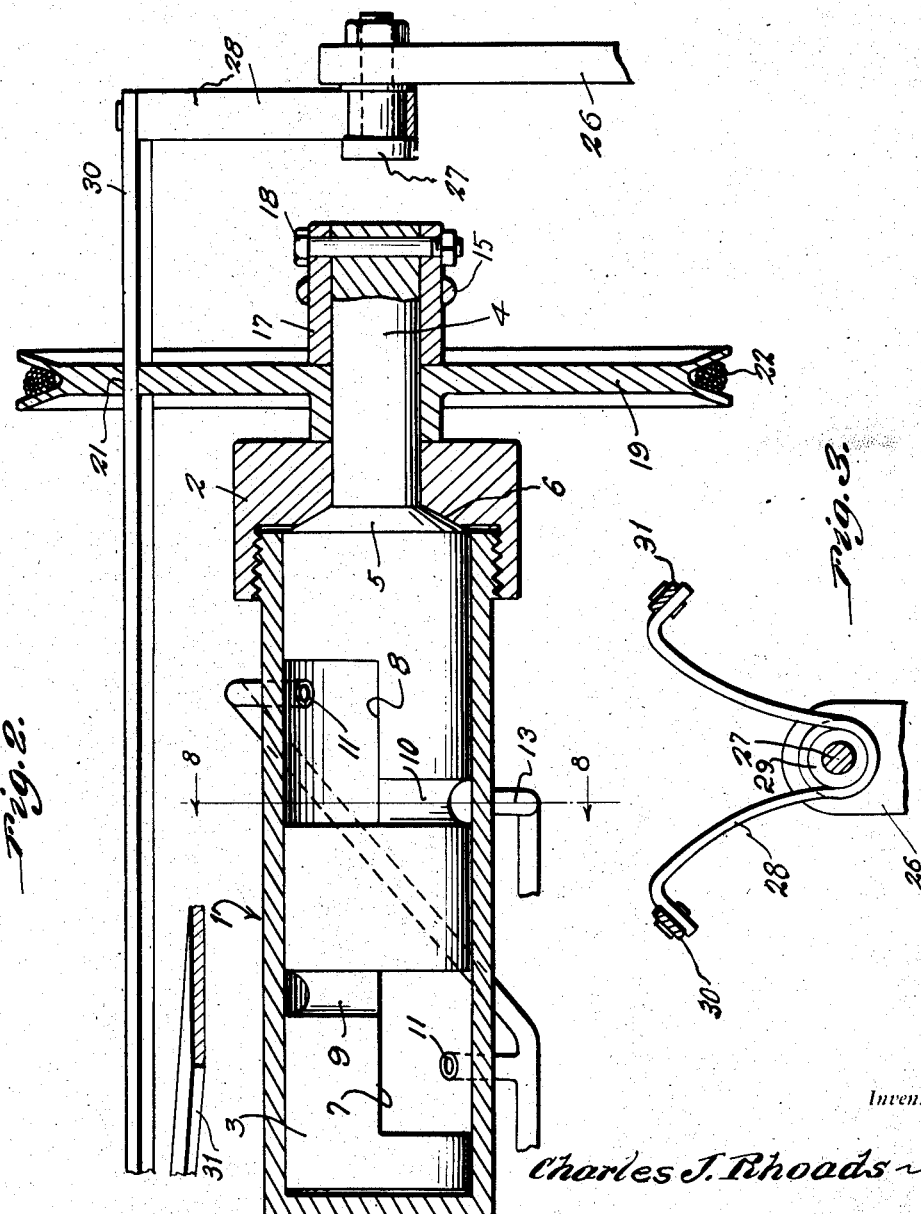

March 27, 1945. C. J. RHOADS 2,372,293
HYDRAULIC ACTUATING CYLINDER CONTROL VALVE
Filed July 7, 1943 3 Sheets-Sheet 3
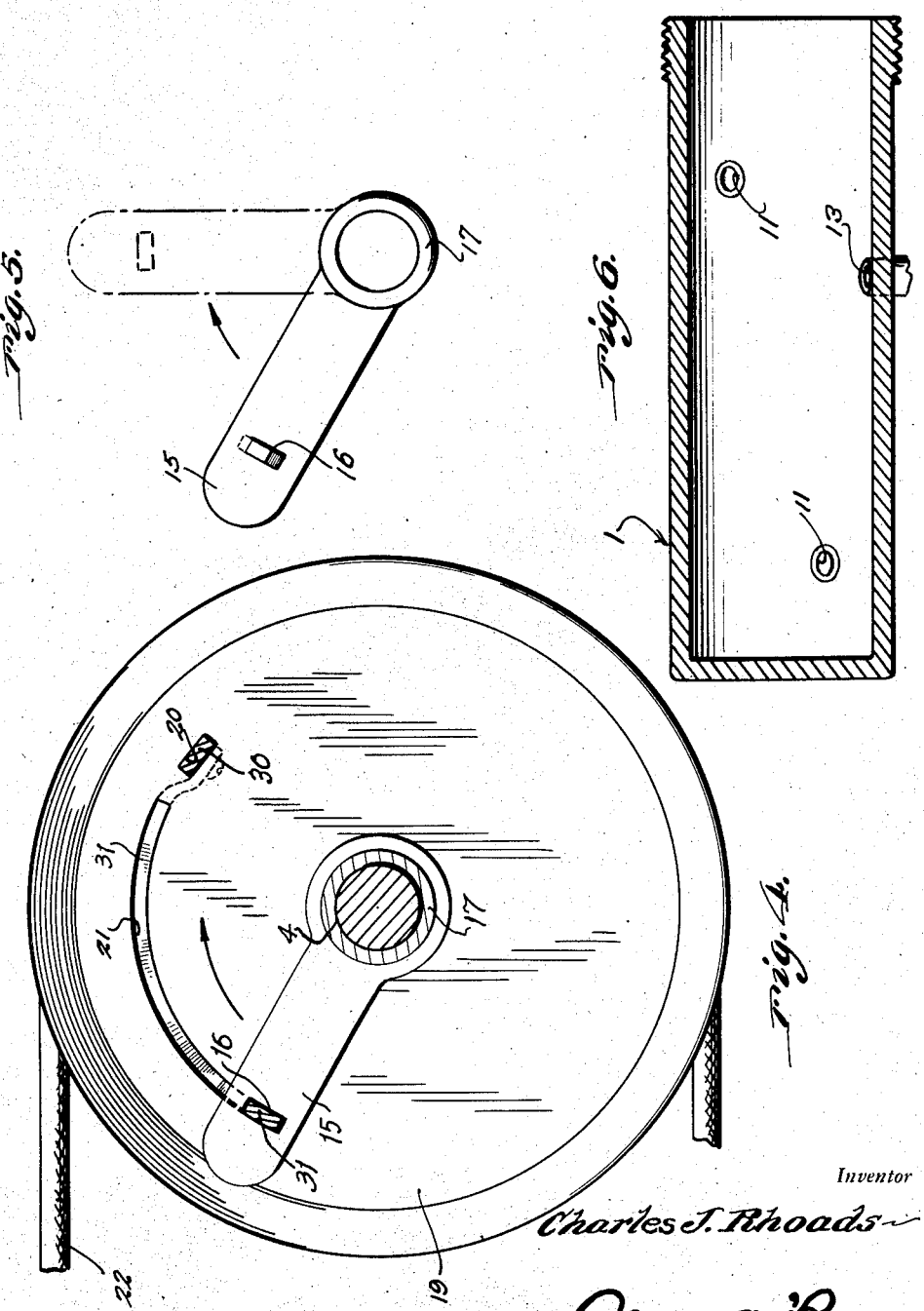
Inventor
Charles J. Rhoads
By Clarence A. O'Brien
and Harvey B. Jacobson
Attorneys Patented Mar. 27, 1945

2,372,293

UNITED STATES PATENT OFFICE 2,372,293

HYDRAULIC ACTUATING CYLINDER CONTROL VALVE

Charles J. Rhoads, Bryan, Tex.

Application July 7, 1943, Serial No. 493,783

2 Claims. (Cl. 121—41)

The present invention relates to new and useful improvements in hydraulic actuating cylinder control valves for use particularly, but not necessarily, in large aircraft and has for its primary object to provide, in a manner as hereinafter set forth, novel means operable, if desired, from a remote point, whereby the piston of the actuating cylinder may be caused to move to any desired position within its operating range where it will be arrested and retained.

Other objects of the invention are to provide a control valve of the character described for hydraulic actuating cylinders which will be of simple construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a top plan view, showing a control valve constructed in accordance with the present invention connected to the piston rod of a hydraulic actuating cylinder.

Figure 2 is a view in longitudinal section through the device.

Figure 3 is a cross-sectional view, taken substantially on the line 3—3 of Figure 1.

Figure 4 is a cross-sectional view, taken substantially on the line 4—4 of Figure 1 with parts omitted.

Figure 5 is a detail view in elevation of the rotary valve core operating arm.

Figure 6 is a view in longitudinal section through the cylindrical valve casing.

Figure 7 is a fragmentary view in section through the pulley, showing the means for securing the operating cable thereto.

Figure 8 is a cross-sectional view through the valve, taken on line 8—8 of Figure 2.

Referring now to the drawings in detail, it will be seen that the embodiment of the invention which has been illustrated comprises a cylindrical casing 1 of suitable dimensions. Threaded on one end of the cylinder 1 is a removable closure cap 2. Mounted for rotary adjustment in the cylindrical casing 1 is a core 3. Projecting longitudinally from one end of the core 3 is a reduced shaft 4 which is journaled in an opening provided therefor in the cap 2. The reduced shaft 4 provides a conical shoulder 5 which is rotatable on a correspondingly shaped bearing surface 6 in the cap 2.

The core 3 has formed in its end portions, and on diametrically opposite sides, substantially segmental recesses 7 and 8. A circumferential groove 9 in the core 3 communicates at both ends with the recess 7. A similar groove 10 communicates with the recess 8. The grooves 9 and 10, it will be observed, are located at the adjacent ends of the recesses 7 and 8. The rotary core 3 controls pairs of ports 11 and 12 in the end portions of the casing 1 which are adapted for communication with the recesses 7 and 8. A pair of ports 13 in the casing 1 are in constant communication with the recesses 7 and 8 through the grooves 9 and 10. The ports 11 and 12 are connected, respectively, to the pressure and the return sides of the hydraulic system. The ports 13 are connected to the ends of the hydraulic actuating cylinder 14, one to each end.

Fixed on the outer portion of the shaft 4 is an arm 15 having an opening 16 therein. The arm 15 projects from a sleeve 17 which is secured by a bolt 18 on the shaft 4.

Journaled on the shaft 4 between the sleeve 17 and cap 2 is a grooved pulley 19. The pulley 19 has formed therein an opening 20. Adjacent the opening 20, the pulley 19 is further provided with a circumferential slot 21 (see Fig. 4).

A manually operable actuating cable 22 is trained around the pulley 19. As illustrated to advantage in Fig. 7 of the drawings, a clamp 23 positively secures the pulley 19 to the cable 22 for actuation thereby. The clamp 23 comprises a bolt 24 which is threaded into a radial socket provided therefor in the pulley 19.

Fixed on the outer end portion of the piston rod 25 which projects from one end of the hydraulic actuating cylinder 14 is an arm 26. Mounted on the free end portion of the arm 26 is a pin 27 which is longitudinally aligned with the shaft 4. A yoke 28 is rotatably mounted on the pin 27. Fixed in the bight portion of the yoke 28 is a bearing 29 (see Fig. 3) which is journaled on the pin 27.

A longitudinal bar 30 extends slidably through the opening 20 in the pulley 19 and is secured at one end to an end portion of the yoke 28. Secured at one end to the other end portion of the yoke 28 is a spirally twisted cam bar 31 which is operable in the opening 16 of the arm 15 and in the slot 21 of the pulley 19. The cam bar 31 is secured at its other end to the end portion of the bar 30 which is remote from the yoke 28. This is shown to advantage in Fig. 1 of the drawings. It will be noted that the cam bar 31 is parallel with the axes of parts 4, 15, 19 and 28 to permit operation of the control device in the manner described below.

Briefly, the operation of the device is substantially as follows:

Rotation of the core 3 in the cylinder 1 alternately opens and closes the pairs of ports 11 and 12. With the core 3 one-half turn from the position shown in Fig. 8 of the drawings, all of the ports 11 and 12 are closed thereby. As hereinbefore stated, the ports 13 are constantly open. When the ports 11 and 12 are all closed, it will be assumed that the piston in the hydraulic actuating cylinder 14 is at the midpoint of its travel range. Also, the bars 30 and 31 are at the midpoints of their travel through the members 15 and 19. With the core 3 at the aforesaid position, the piston in the hydraulic actuating cylinder 14 is locked against movement in either direction. To put the control valve into operation, the pulley 19 is actuated through the medium of the cable 22. Thus, rotation is imparted to the core 3 through the members 20, 28, 31, 15 and 4. Rotation of the core 3 in this manner opens one of the ports 12 in one end portion of the casing 1 and one of the ports 11 in the other end portion of said casing. This permits the fluid from the pressure side of the hydraulic system to flow into the casing 1 through the port which is open and out of said cylinder through the adjacent port 13 to the end of the actuating cylinder 14 to which these ports are connected. As the other port 13 is connected to the other end of the actuating cylinder 14, the fluid in said other end of said actuating cylinder may flow into the return side of the hydraulic system. As the piston in the actuating cylinder 14 moves, the assembly mounted on the rod 25 moves therewith. The pulley 19 is held against rotation by the cable 22. Thus, when the cam 31, which the slot 21 in the pulley 19 accommodates, slides through the arm 15, said arm is actuated by said cam for rotating the core 3. Rotation of the core 3 by the cam 31 is in the opposite direction from which said core was manually turned through the cable 22. In this manner the core 3 is returned to its neutral position of Fig. 8 of the drawings thereby arresting and locking the piston in the hydraulic actuating cylinder 14 when it has moved a distance corresponding to that which the cable 22 was moved. This automatic cut-off feature of the control valve makes it possible for the operator of the hydraulic actuating cylinder 14 to cause the piston therein to be moved to any point within its range of travel and locked in this position.

It is believed that the many advantages of a hydraulic actuating cylinder control valve constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A control device, for hydraulic actuating cylinders including a fluid-operated piston and rod connected thereto, comprising a substantially cylindrical casing having ports therein communicating with the actuating cylinder on opposite sides of the piston for the passage of fluid to and from said cylinder, a core rotatably mounted in the casing for controlling the ports, a shaft projecting from the core, an arm fixed on said shaft, a pulley rotatably mounted on the shaft, means for actuating the pulley, a yoke rotatably mounted on the piston rod, a bar mounted on one end portion of the yoke and extending slidably through the pulley, a cam on the other end portion of the yoke slidably connected to the arm and operable through the pulley, said bar, the yoke and cam constituting means for connecting the arm to the pulley for manually rotating the core in one direction for moving the piston to a predetermined position in the actuating cylinder, said cam further constituting means, operable by the rod, for rotating the core in the opposite direction for arresting and retaining the piston when said piston reaches said predetermined position.

2. A control device, for hydraulic actuating cylinders including a fluid-operated piston and a rod connected thereto, comprising a substantially cylindrical casing having ports therein communicating with the actuating cylinder on opposite sides of the piston for the passage of fluid to and from said cylinder, a core rotatable in the casing for controlling the ports, a shaft projecting longitudinally from one end of said core, a pulley journaled on the shaft, said pulley having an opening therein and further having a circumferential slot therein, an arm fixed on the shaft and having an opening therein aligned with the slot, an arm fixed on the piston rod, a yoke rotatably mounted on said arm, a bar having one end portion secured to an end portion of the yoke, said bar extending slidably through the opening in the pulley, a cam having one end portion secured to the other end portion of the yoke, said cam extending slidably through the opening in the arm and the slot in the pulley, the other end portion of the cam being secured to the other end portion of the bar, and a cable trained around the pulley for manually rotating the core in one direction for moving the piston to a predetermined position in the cylinder, the cam constituting means, operable by the rod, for actuating the core in the opposite direction for arresting and retaining the piston when said piston reaches said predetermined position.

CHARLES J. RHOADS.